Figure 4:
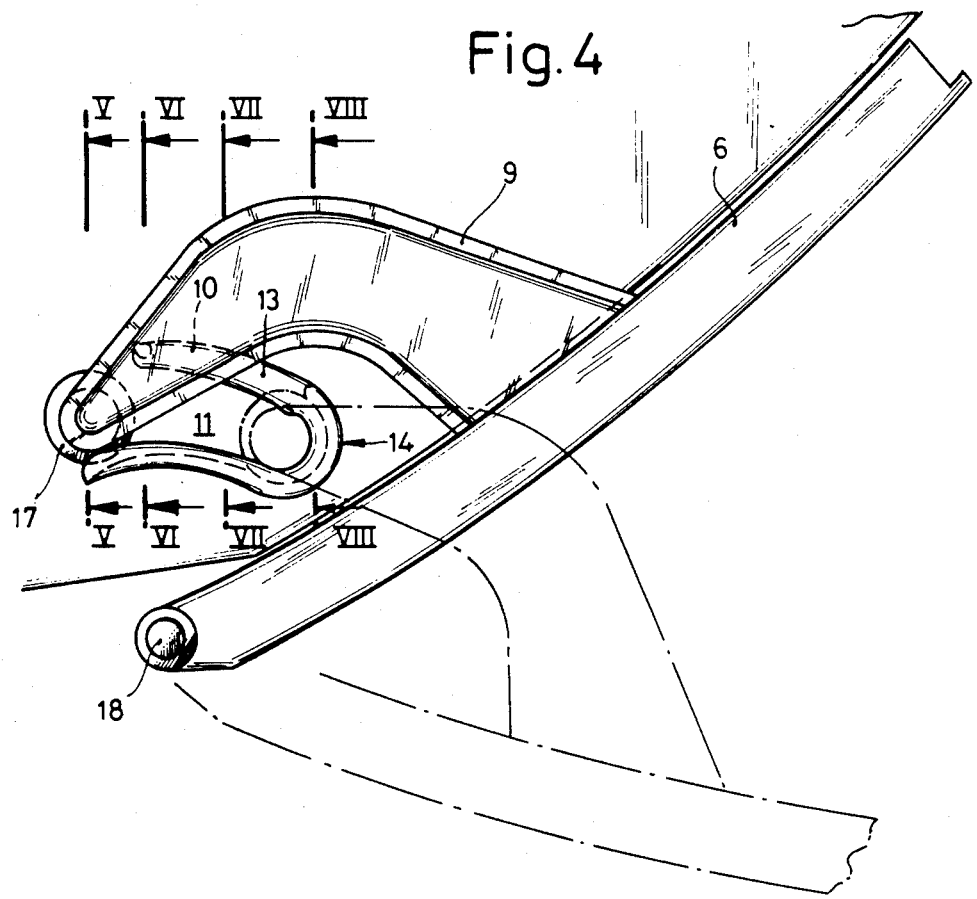

United States Patent [19]

Langer

[11] Patent Number: 4,725,089

[45] Date of Patent: Feb. 16, 1988

[54] STOWAGE COMPARTMENT

[75] Inventor: Hans-Jürgen Langer, Darmstadt-Ebertstadt, Fed. Rep. of Germany

[73] Assignee: General Motors Corporation, Detroit, Mich.

[21] Appl. No.: 33,036

[22] Filed: Mar. 31, 1987

[30] Foreign Application Priority Data

Apr. 3, 1986 [DE] Fed. Rep. of Germany ....... 3611094

[51] Int. Cl.⁴ ............................................... B60R 7/06
[52] U.S. Cl. .............................. 296/37.12; 217/60 D; 312/315
[58] Field of Search ........................... 296/37.12, 37.7; 220/334; 217/60 D, 60 C, 60 B, 60 E; 312/315, 307, 310, 276; 180/90; 49/381

[56] References Cited

U.S. PATENT DOCUMENTS 3,386,765 6/1968 Drach, Jr. ...................... 296/37.12
3,503,648 3/1970 James ............................ 296/37.12
4,596,416 6/1986 Müller ........................... 296/37.12

FOREIGN PATENT DOCUMENTS 0140280 8/1982 Japan .
0177739 10/1983 Japan .

Primary Examiner—Robert R. Song
Attorney, Agent, or Firm—Charles E. Leahy

[57] ABSTRACT

A cover for a stowage compartment can pivot about a pivot axis running along the lower edge of the stowage compartment. On a stay projecting into the stowage compartment it has an eye, which engages in a guide on one side wall of the stowage compartment. This guide narrows towards the end at the opening side so that the eye is increasingly braked by clamping action as the cover is opened.

4 Claims, 8 Drawing Figures

U.S. Patent  Feb. 16, 1988  Sheet 1 of 2  4,725,089
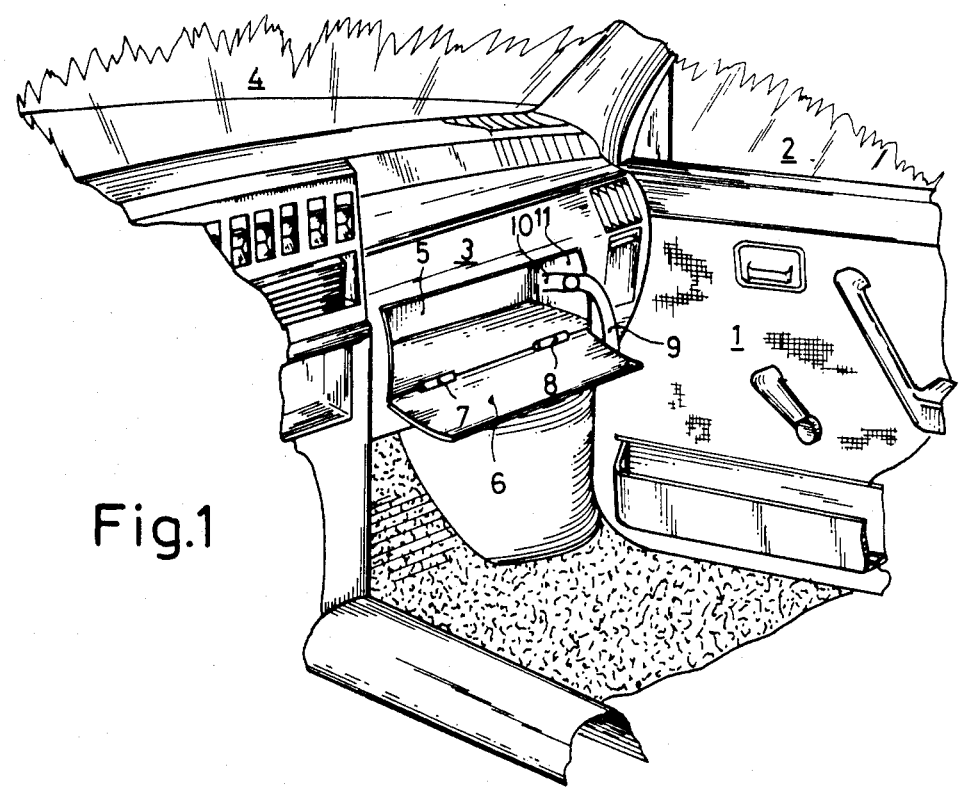
Fig.1
Fig.2
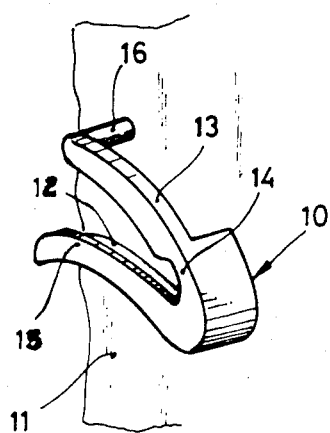
Fig.3
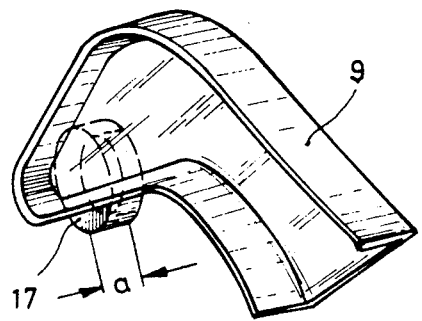

U.S. Patent  Feb. 16, 1988  Sheet 2 of 2  4,725,089

STOWAGE COMPARTMENT

The invention pertains to a stowage compartment, in particular a glove compartment provided for a motor vehicle, which has a cover which is hinged about a pivoting axis placed horizontally on the underside of the stowage compartment and has on one side of the cover a stay rigidly connected to it and projecting into the stowage compartment, which engages with an eye in a guide on the inner side wall of the stowage compartment which limits the maximum opening angle of the cover. Stowage compartments of this type are generally known and common in motor vehicles.

In stowage compartments of this type, in most cases the maximum opening angle of the cover must be limited, so that the hinged open cover remains, for example, in the horizontal position. In motor vehicles this is important so that the open cover is available as a temporary surface for placing things on, so that it does not restrict the passenger's leg room, and so that its suspension system allowing for the hinged movement is not damaged. The opening angle should, however, not be abruptly limited, since if the cover is allowed to pivot downward after being unlocked and released, it has so much momentum that damage to its suspension, guide elements or other components can occur when it reaches the stop.

In practice, damping devices similar to the damping devices in door closers are used to damp the opening movement. The hinge is thereby increasingly slowed down as it approaches the stop, and therefore stops gently; however this sort of damping device is relatively expensive.

The purpose on which the invention is based is that of creating a stowage compartment of the type mentioned above so that with the least possible expense, a fixed limit to the maximum opening angle of the cover is produced, and that the cover is stopped with sufficiently reduced energy of motion.

According to the invention, this purpose is fulfilled by the fact that the guide has at least one elastic guide zone which becomes increasingly narrow down the cross section of the guide toward the opening side of the guide, and that the cross section of the eye is greater than the guide cross section at the end on the opening side.

Because of this configuration according to the invention, the eye becomes increasingly clamped in the guide as it moves in the direction of the stop on the opening side, but the clamping action must not be so strong that the eye does not reach the stop by itself. Such a configuration is easily practicable for manufacturing the guide from plastic using the injection molding process and results in almost no additional costs. The desired braking of the opened cover before it reaches the end position is thus achieved with extremely little expense. Naturally, the clamping effect could also be set high enough that the cover does not of itself reach its end position, but remains in intermediate positions.

One advantageous embodiment of the invention consists of the fact that the guide has a lower guide profile on which the eye is supported over its length of travel, and which has at the end on the opening side an upturned curved stop to accommodate the eye, and the lower guide profile partially extends beyond the eye with a side flange. The result of this configuration is that the eye inserted into the guide cannot jump out of it. Because of the fact that the guide with its curved stop simultaneously forms the stop for the eye at the maximum opening angle, separate components for this stop are unnecessary.

Basically, the eye could be increasingly clamped in the guide during movement in the direction of opening either by means of its outside surface or by means of its end surfaces. The guide can be configured in a particularly simple way, however, if the unobstructed inner width of the lower guide profile in the zone of the curved stop is less than the width of the eye, and if the upper end of the curved stop continues as an elastic upper guide profile running only on one side of the eye, which contacts the eye near the stop with pretension, and with increasing distance from the curved stop is at an increasing distance from the side wall of the stowage compartment bearing the guide.

To ensure that the upper guide profile has sufficient elasticity, and at the same time, to ensure that its distance from the side wall at the open end of the guide is sufficient to allow the eye to engage, another embodiment of the invention provides for a strut to be present at the end of the upper guide profile opposite the stop, pointing toward the side wall and connected to it.

The invention allows many embodiments. One of them is schematically illustrated in the drawing and will be described below. The drawing shows:

FIG. 1: a perspective view of the front interior of a motor vehicle with the dashboard and a stowage compartment according to the invention;

FIG. 2: a perspective view of a guide in one side wall of the stowage compartment;

FIG. 3: a perspective view of a stay for the cover of the stowage compartment;

FIG. 4: a schematic partial side view of the cover and the guide for the stowage compartment;

FIGS. 5–8: vertical sections along the correspondingly indicated lines in FIG. 4, through an arrangement according to FIG. 4.

FIG. 1 shows part of the right front door 1 of a motor vehicle with one side window 2. Parts of a dashboard 3 and a windshield 4 are also illustrated. Located in the dashboard 3 is a stowage compartment, usually called a glove compartment, which has a cover 6 which can pivot about hinges 7, 8 placed on its lower edge, so that it can be hinged from the open position shown to a closed position. A stay 9 is provided on the outer side of the cover 7. The free end of this stay 9 engages in a guide 10 which is attached to one side wall 11 of the stowage compartment. Particularly essential for the invention is the configuration of the guide 10, which may be gathered from the subsequent figures.

FIG. 2 shows that the guide 10 consists of a lower guide profile 12 and an upper guide profile 13. The lower guide profile 12 has an upturned curved stop 14 on its side facing the opening of the stowage compartment 5, and a lateral flange 15 over its entire length on the side opposite the side wall 11. The upper guide profile forms the continuation of this flange 15 and has at its end a strut 16 pointing towards the side wall 11 and connected to it, which is connected to the side wall. The distance between the upper guide profile 13 and the side wall increases somewhat from the curved stop 14 towards the strut 16. Furthermore, at least the upper guide profile 13 is made of an elastic material.

FIG. 3 shows an upper zone of the stay 9. Note that the latter has at its free end an eye 17 oriented at right angles to its main extension direction, which engages in the guide 10 when the cover 6 is installed. The width of the eye 17 is indicated in this FIG. 3 as "a".

FIG. 4 shows, with solid lines, a part of a cover 6 in the closed position with its stay 9 and the eye 17. Note also in this illustration a pivot axis 18, about which the cover 6 pivots while opening. The eye 17 is located, when the cover 6 is in the closed position, at the open end of the guide 10. As the cover 6 is opened, the eye 17 moves in the direction of the curved stop 14, against which it lies in the end position. It is important for the invention that the upper guide profile 13 be at less of a distance from the side wall 11 towards the stop 14 than at its other end, so that the eye 17 is increasingly clamped and thereby braked before it reaches its end position.

Figure 5:
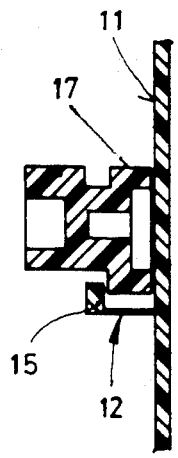

FIGS. 5 through 8 show cross sections through the guide 10 at various points. FIG. 5 illustrates the position of the eye 17 when the cover 6 is closed. Note that the eye is located in the lower guide profile 12. The lateral flange 15 reaches laterally slightly beyond this eye 17, so that it cannot come out of the guide profile 13. The guide profile 12 is limited by the side wall 11 towards the side opposite the flange 15.

Figure 6:
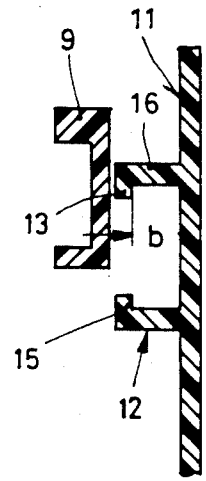

FIG. 6 shows a vertical section through the zone of the guide 10, in which the upper guide profile 13, which is connected with the wall 11 through the strut 16, begins. The stay 9 is also visible in this illustration.

Figure 7:
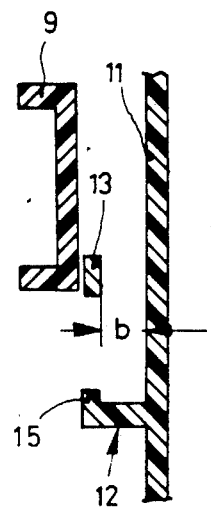
Figure 8:
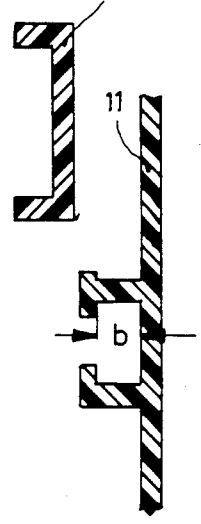

FIG. 7 shows that the upper guide profile is open to the top in the zone illustrated. It is flat in overall configuration. The distance between the inner surface of the upper guide profile 13 and the wall 11, labeled "b" in FIGS. 6-8, is larger at the beginning of the guide profile 13 than the width of the eye 17, labeled "a" in FIG. 3. This distance "b" decreases, however, towards the curved stop 14. In the region of the stop 14, which is shown in FIG. 8, it is slightly smaller than the width "a" of the eye 17. This means that the eye is braked by clamping before it reaches its end position, but it reliably reaches this position since the material of the guide 10 is sufficiently elastic to yield and therefore not to halt the eye 17.

The embodiments of the invention in which an exclusive property or privilege is claimed are defined as follows:

1. Stowage compartment in particular a glove compartment provided for a motor car, which has a cover which is hinged about a pivoting axis running horizontally along the underside of the stowage compartment and has on one side of the cover a stirrup rigidly connected with it and projecting into the stowage compartment, which engages with an eye in a guide on the inner side wall of the stowage compartment which limits the maximum angle of opening of the cover, characterized by the fact that the guide has at least one elastic guide zone which increasingly narrows down the cross section of the guide towards the end of the guide on the opening side and that the cross section of the eye is greater than the cross section of the guide at the end on the opening side.

2. Stowage compartment as per claim 1, characterized by the fact that the guide has a lower guide profile on which the eye is supported over its length of travel and which at the end on the opening side has an upturned curved stop to receive the eye, and that the lower guide profile partly engages over the eye with a side flange.

3. Stowage compartment as per claim 1, characterized by the fact that the unobstructed inside space of the lower guide profile in the zone of the curved stop is smaller than the width of the eye and that at the upper end of the curved stop an elastic upper guide profile closes just to the side of the eye, and this comes up against the eye with pre-tension and with increasing distance from the curved stop has an increasing distance from the side wall of the stowage compartment carrying the guide.

4. Stowage compartment as per one or more of the previous claims, characterized by the fact that at the end of the upper guide profile opposite the stop a strut, going towards the side wall and connected with it, is provided.

* * * * *